United States Patent [19]

Speca et al.

[11] Patent Number: 6,114,479
[45] Date of Patent: *Sep. 5, 2000

[54] POLYMERIZATION CATALYST SYSTEMS, THEIR PRODUCTION AND USE

[75] Inventors: Anthony Nicholas Speca, Kingwood; Jeffrey Lawrence Brinen, League City, both of Tex.

[73] Assignee: Exxon Chemical Patents Inc., Houston, Tex.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/691,848

[22] Filed: Jul. 30, 1996

Related U.S. Application Data

[60] Continuation of application No. 08/691,848, Jul. 30, 1996, which is a division of application No. 08/502,231, Jul. 13, 1995.

[51] Int. Cl.$^7$ ....................................................... C08F 4/02
[52] U.S. Cl. .......................... 526/147; 526/142; 526/129; 526/351; 502/152; 502/155
[58] Field of Search ...................................... 526/142, 129, 526/147, 141, 351; 502/152, 155

[56] References Cited

U.S. PATENT DOCUMENTS

| | | | |
|---|---|---|---|
| 5,240,894 | 8/1993 | Burkhardt et al. | 526/160 |
| 5,243,001 | 9/1993 | Winter et al. | 526/127 |
| 5,410,002 | 4/1995 | Govoni et al. | 526/125.6 |
| 5,473,028 | 12/1995 | Nowlin et al. | 526/119 |
| 5,529,965 | 6/1996 | Chang | 526/124.2 |
| 5,547,675 | 8/1996 | Canich | 502/117 |
| 5,552,358 | 9/1996 | Speca | 526/141 |

*Primary Examiner*—David W. Wu
*Assistant Examiner*—Ling-Siu Choi
*Attorney, Agent, or Firm*—Paige Schmidt; Myron B. Kurtzman

[57] ABSTRACT

This invention is generally directed toward a supported catalyst system useful for polymerizing olefins. The method for supporting the catalyst of the invention provides for a supported bulky ligand transition metal catalyst which when utilized in a polymerization process substantially reduces the reactor fouling and sheeting in a gas, slurry or liquid pool polymerization process.

14 Claims, No Drawings

POLYMERIZATION CATALYST SYSTEMS, THEIR PRODUCTION AND USE

This is a continuation of application Ser. No. 08/601,848 filed on Jul. 30, 1996 which is a divisional of application Ser. No. 08/502,231 filed on Jul. 13, 1995.

FIELD OF THE INVENTION

This invention relates to a method for the production of metallocene catalyst system, catalyst systems resulting from such method and the use of such systems in olefin polymerization processes. The invention particularly relates to a method for preparing a supported metallocene catalyst system which is particularly suitable for use in gas phase and slurry polymerization processes and which results in improved reactor operability.

BACKGROUND OF THE INVENTION

It is widely known that olefin polymerization processes utilizing bulky ligand transition metal catalysts, otherwise known as metallocene catalysts, have produced a diverse array of new polymers which are useful in a wide variety of applications and products.

A well known problem associated with the use of metallocene catalyst systems is their tendency to cause fouling and/or sheeting in gas phase and slurry polymerization processes. Fouling on the walls of the reactor and/or reactor components results in many serious problems including poor heat transfer, particle morphology, and reactor shutdown.

In an effort to solve these problems, many catalyst system modifications and modifications to the polymerization conditions have been reported. For example, U.S. Pat. Nos. 4,792,592; 4,808,667; 4,855,370; 4,876,320; 4,978,722; 5,026,795; 5,034,481; 5,037,905 are all directed toward the use of antistatic agents or other additives.

While these approaches may reduce fouling or sheeting somewhat, they are not generally useful with all catalyst systems, they may be expensive to employ, and they may not reduce both fouling and sheeting to a level sufficient for the successful operation of a continuous process, particularly a commercial or large-scale process. Thus, it would be highly advantageous to have an improved metallocene catalyst system that in a polymerization process would significantly enhance reactor operability by reducing both fouling and sheeting.

SUMMARY OF THE INVENTION

This invention is generally directed towards a method for the manufacture of supported metallocene catalyst systems to catalyst systems resulting from such methods and to the use of such catalyst systems in polymerization processes.

In one embodiment an improved method is provided to produce a supported bulky ligand transition metal catalyst system by contacting a porous support with a reaction product of a metallocene catalyst component, an alumoxane and a surface modifier, where the metallocene catalyst component is a chiral, Group 4, 5 or 6 transition metal, bridged, substituted bisindenyl.

In yet another embodiment of the invention, there is provided a process for producing propylene polyolefins by contacting propylene monomer, optionally with a comonomer in the presence of the catalyst system described above.

DETAILED DESCRIPTION OF THE INVENTION

Introduction

This invention is generally directed toward a supported catalyst system useful for polymerizing olefins. The method for forming the catalyst system of the invention results in a useful polymerization catalyst exhibiting improved reactor operability. The catalyst system of the invention not only reduces fouling and sheeting in a gas phase, slurry or liquid polymerization process but the catalyst system has better flow properties important to feeding the catalyst into the reactor. Also, the catalyst system of this invention results in a high bulk density polymer product having improved physical properties. Further, it has been discovered that the use of a surface modifier in the method of the invention protects the catalyst from direct or substantial reaction with scavenging components typically used to remove impurities. These scavengers can interact with the components of the catalyst system to decrease catalyst activity and reactor operability.

Making the catalyst of the invention as described above results in a simple, commercially useful and cost effective supported catalyst system which exhibits a reduced tendency to cause sheeting or fouling during the polymerization of propylene polymers or copolymers without a significant reduction in catalytic activity.

Metallocene Catalyst Components

The metallocene components employed in the present invention comprise a Group 4, 5, or 6 transition metal, biscyclopentadienyl derivatives, preferably bisindenyl metallocene components having the following general structure:

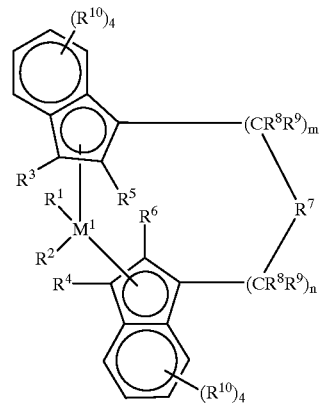

wherein $M^1$ is a metal of Group 4, 5, or 6 of the Periodic Table, for example titanium, zirconium, hafnium, vanadium niobium, tantalum, chromium, molybdenum and tungsten, preferably, zirconium, hafnium and titanium, most preferably zirconium;

$R^1$ and $R^2$ are identical or different, are one of a hydrogen atom, a $C_1$–$C_{10}$ alkyl group, preferably a $C_1$–$C_3$ alkyl group, a $C_1$–$C_{10}$ alkoxy group, preferably a $C_1$–$C_3$ alkoxy group, a $C_6$–$C_{10}$ aryl group preferably a $C_6$–$C_8$ aryl group, a $C_6$–$C_{10}$ aryloxy group, preferably a $C_6$–$C_8$ aryloxy group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, or a halogen atom, preferably chlorine;

$R^3$ and $R^4$ are hydrogen atoms;

$R^5$ and $R^6$ are identical or different, preferably identical, are one of a halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_8$ aryl group, a $C_2$–$C_{10}$ alkenyl group, preferably a $C_2$–$C_4$ alkenyl group, a $C_7$–$C_{40}$-arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, a $-NR_2^{15}$, $-SR^{15}$, $-OR^{15}$, $-OSiR_3^{15}$ or $-PR_2^{15}$ radical, wherein $R^{15}$ is one of a halogen atom, preferably a chlorine atom, a $C_1$–$C_{10}$ alkyl group, preferably a $C_1$–$C_3$ alkyl group, or a $C_6$–$C_{10}$ aryl group, preferably a $C_6$–$C_9$ aryl group;

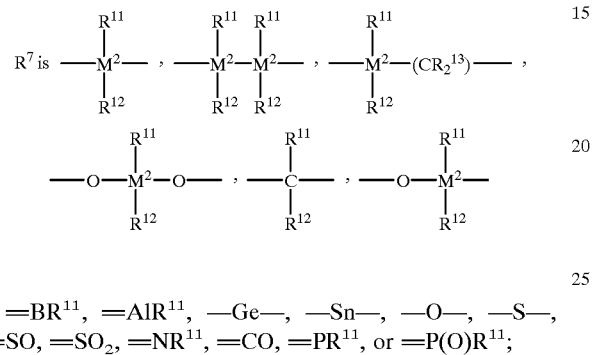

$=BR^{11}$, $=AlR^{11}$, $-Ge-$, $-Sn-$, $-O-$, $-S-$, $=SO$, $=SO_2$, $=NR^{11}$, $=CO$, $=PR^{11}$, or $=P(O)R^{11}$;

wherein:

$R^{11}$, $R^{12}$ and $R^{13}$ are identical or different and are a hydrogen atom, a halogen atom, a $C_1$–$C_{20}$ alkyl group, preferably a $C_1$–$C_{10}$ alkyl group, a $C_1$–$C_{20}$ fluoroalkyl group, preferably a $C_1$–$C_{10}$ fluoroalkyl group, a $C_6$–$C_{30}$ aryl group, preferably a $C_6$–$C_{20}$ aryl group, a $C_6$–$C_{30}$ fluoroaryl group, preferably a $C_6$–$C_{20}$ fluoroaryl group, a $C_1$–$C_{20}$ alkoxy group, preferably a $C_1$–$C_{10}$ alkoxy group, a $C_2$–$C_{20}$ alkenyl group, preferably a $C_2$–$C_{10}$ alkenyl group, a $C_7$–$C_{40}$ arylalkyl group, preferably a $C_7$–$C_{20}$ arylalkyl group, a $C_8$–$C_{40}$ arylalkenyl group, preferably a $C_8$–$C_{22}$ arylalkenyl group, a $C_7$–$C_{40}$ alkylaryl group, preferably a $C_7$–$C_{20}$ alkylaryl group or $R^{11}$ and $R^{12}$, or $R^{11}$ and $R^{13}$, together with the atoms binding them, can form ring systems;

$M^2$ is silicon, germanium or tin, preferably silicon or germanium, most preferably silicon;

$R^8$ and $R^9$ are identical or different and have the meanings stated for $R^{11}$;

m and n are identical or different and are zero, 1 or 2, preferably zero or 1, m plus n being zero, 1 or 2, preferably zero or 1; and the radicals $R^{10}$ are identical or different and have the meanings stated for $R^{11}$, $R^{12}$ and $R^{13}$. Two adjacent $R^{10}$ radicals can be joined together to form a ring system, preferably a ring system containing from about 4–6 carbon atoms.

Alkyl refers to straight or branched chain substituents. Halogen (halogenated) is fluorine, chlorine, bromine or iodine atoms, preferably fluorine or chlorine.

Particularly preferred metallocenes are compounds of the structures:

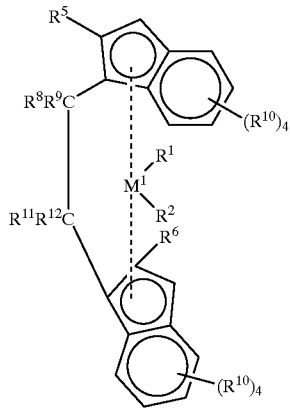

(A)

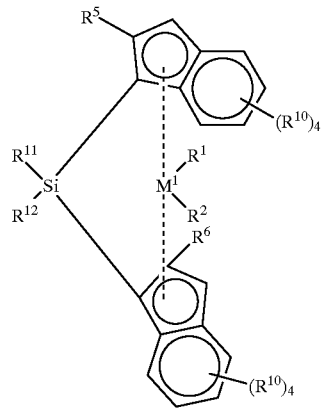

(B)

wherein:

$M^1$ is Zr or Hf, $R^1$ and $R^2$ are methyl or chlorine, and $R^5$, $R^6R^8$, $R^9$, $R^{10}$, $R^{11}$ and $R^{12}$ have the above-mentioned meanings.

The chiral metallocenes are used as a racemate for the preparation of highly isotactic polypropylene copolymers. It is also possible to use the pure R or S form. As optically active polymer can be prepared with these pure stereoisomeric forms. It is preferred that the meso form of the metallocenes be removed to ensure the center (i.e., the metal atom) provides stereoregular polymerization.

Separation of the stereoisomers can be accomplished by known literature techniques. For special products it is also possible to use rac/meso mixtures.

Generally, the metallocenes are prepared by a multi-step process involving repeated deprotonations/metallations of the aromatic ligands and introduction of the bridge and the central atom by their halogen derivatives. The following reaction scheme illustrates this generic approach:

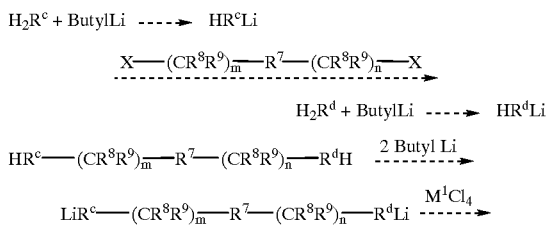

-continued

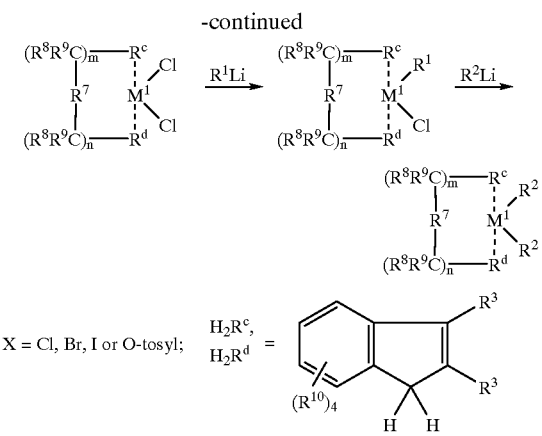

X = Cl, Br, I or O-tosyl;

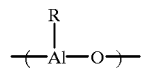

The reader is referred to the *Journal of Organometallic Chem.*, volume 288, (1985), pages 63–67, and EP-A-320762, for preparation of the metallocenes described, both references are herein fully incorporated by reference.

Illustrative but non-limiting examples of metallocenes include: Dimethylsilandiylbis (2-methyl-4-phenyl-1-indenyl)ZrCl$_2$ Dimethylsilandiylbis(2-methyl-4,5-benzoindenyl)ZrCl$_2$; Dimethylsilandiylbis(2-methyl-4,6-diisopropylindenyl)ZrCl$_2$; Dimethylsilandiylbis(2-ethyl-4-phenyl-1-indenyl)ZrCl$_2$; Phenyl(Methyl)silandiylbis(2-methyl-4-phenyl-1-indenyl)ZrCl$_2$, Dimethylsilandiylbis(2-methyl-4-(1-naphthyl)-1-indenyl)ZrCl$_2$, Dimethylsilandiylbis(2-methyl-4-(2-naphthyl)-1-indenyl)ZrCl$_2$, Dimethylsilandiylbis(2-methyl-4,5-diisopropyl-1-indenyl)ZrCl$_2$, Dimethylsilandiylbis(2,4,6-trimethyl-1-indenyl)ZrCl$_2$, Phenyl(Methyl)silandiylbis(2-methyl-4,6-diisopropyl-1-indenyl)ZrCl$_2$, 1,2-Ethandiylbis(2-methyl-4,6-diisopropyl-1-indenyl)ZrCl$_2$, 1,2-Butandiylbis(2-methyl-4,6-diisopropyl-1-indenyl)ZrCl$_2$, Dimethylsilandiylbis(2-methyl-4-ethyl-1-indenyl)ZrCl$_2$, Dimethylsilandiylbis(2-methyl-4-isopropyl-1-indenyl)ZrCl$_2$, Dimethylsilandiylbis (2-methyl-4-t-butyl-1-indenyl)ZrCl$_2$, Phenyl(Methyl)silandiylbis(2-methyl-4-isopropyl-1-indenyl)ZrCl$_2$, Dimethylsilandiylbis(2-ethyl-4-methyl-1-indenyl)ZrCl$_2$, Dimethylsilandiylbis(2,4-diimethyl-1-indenyl)ZrCl$_2$, Dimethylsilandiylbis(2-methyl-4-ethyl-1-indenyl)ZrCl$_2$, Dimethylsilandiylbis(2-methyl-α-acenaphth-1-indenyl)ZrCl$_2$, Phenyl(Methyl)silandiylbis(2-methyl-4,5-benzo-1-indenyl)ZrCl$_2$, Phenyl(Methyl)silandiylbis(2-methyl-4,5-(methylbenzo)-1-indenyl)ZrCl$_2$, Phenyl(Methyl)silandiylbis(2-methyl-4,5-(tetramethylbenzo)-1-indenyl)ZrCl$_2$, Phenyl(Methyl)silandiylbis (2-methyl-a-acenaphth-1-indenyl)ZrCl$_2$, 1,2-Ethandiylbis(2-methyl-4,5-benzo-1-indenyl)ZrCl$_2$, 1,2-Butandiylbis(2-methyl-4,5-benzo-1-indenyl)ZrCl$_2$, Dimethylsilandiylbis(2-methyl-4,5-benzo-1-indenyl)ZrCl$_2$, 1,2-Ethandiylbis(2,4,7-trimethyl-1-indenyl)ZrCl$_2$, Dimethylsilandiylbis(2-methyl-1-indenyl)ZrCl$_2$, 1,2-Ethandiylbis(2-metyl-1-indenyl)ZrCl$_2$, Phenyl(Methyl)silandiylbis(2-methyl-1-indenyl)ZrCl$_2$, Diphenylsilandiylbis(2-methyl-1-indenyl)ZrCl$_2$, 1,2-Butandiylbis(2-methyl-1-indenyl)ZrCl$_2$, Dimethylsilandiylbis(2-ethyl-1-indenyl)ZrCl$_2$, Dimethylsilandiylbis(2-methyl-5-isobutyl-1-indenyl)ZrCl$_2$, Phenyl(Methyl)silandiylbis(2-methyl-5-isobutyl-1-indenyl)ZrCl$_2$, Dimethylsilandiylbis(2-methyl-5-t-butyl-1-indenyl)ZrCl$_2$, Dimethylsilandiylbis(2,5,6-trimethyl-1-indenyl)ZrCl$_2$, and the like.

The metallocene catalyst components of this invention are described in detail in U.S. Pat. Nos. 5,149,819, 5,243,001, 5,239,022, 5,296,434 and 5,276,208 all of which are herein fully incorporated by reference.

Activator Components

The activator or cocatalyst component of the present invention is alumoxane.

Generally, the alkylalumoxanes preferred for use in olefin polymerization contain about 4 to 20 of the repeating units:

$$+\!\!\begin{pmatrix} R \\ | \\ Al-O \end{pmatrix}\!\!+$$

where R is a $C_1$–$C_8$ alkyl including mixed alkyls. Particularly preferred are the compounds where R is methyl. There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP-A-0 561 476, EP-B1-0 279 586, EP-A-0 594-218 and WO 94/10180, each of which is fully incorporated herein by reference.

Some methylalumoxane (MAO) solutions tend to become cloudy and gelatinous over time. It may be advantageous to clarify such solutions prior to use. A number of methods may be used to create gel-free MAO solutions or to remove gels from the solutions. Gelled solutions are often simply shaken or decanted. U.S. Pat. No. 5,157,137 discloses a process for forming clear, gel-free solutions of alkylalumoxane by treating a solution of alkylalumoxane with an anhydrous salt and/or hydride of an alkali or alkaline earth metal.

Support Mediums

For purposes of this patent specification the terms "carrier" or "support" are interchangeable and can be any support material, preferably a porous support material, such as for example, talc, inorganic oxides, inorganic chlorides, for example magnesium chloride and resinous support materials such as polystyrene or polystyrene-divinyl benzene, polyolefins or polymeric compounds or any other organic support material and the like, or mixtures thereof.

The preferred support materials are inorganic oxide materials, which include those of Groups 2, 3, 4, 5, 13 or 14 metal oxides. In a preferred embodiment, the catalyst support materials include silica, alumina, silica-alumina, and mixtures thereof. Other inorganic oxides that may be employed either alone or in combination with the silica, alumina or silica-alumina are magnesia, titania, zirconia, and the like.

Preferably, the support has a surface area in the range of from about 10 to about 700 m$^2$/g, a pore volume in the range of from about 0.1 to about 4.0 cc/g and an average particle size in the range of from about 10 to about 500 μm. More preferably, the support surface area is in the range of from about 50 to about 500 m$^2$/g, the pore volume is in the range of from about 0.5 to about 3.5 cc/g and the average particle size is in the range of from about 20 to about 200 μm. Most preferably the surface area range is from about 100 to about 400 m$^2$/g, the pore volume is from about 0.8 to about 3.0 cc/g and the average particle size is from about 10 to about 100 μm. The pore size of the carrier of the invention is preferably in the range of from about 10 to about 1000° A, preferably from about 50 to about 500° A, and most preferably from about 75 to about 350° A.

Surface Modifiers

The term "surface modifier" is defined herein to mean any compound containing at least one electron rich heteroatom from Groups IV, V and/or VI and a hydrocarbyl or substituted hydrocarbyl moiety. Typical heteroatoms are silicon, oxygen, nitrogen, phosphorus, and sulfur. The surface modifier preferably also contains at least one active hydrogen atom attached to the heteroatom. The hydrocarbyl moiety should have a molecular weight such that it is soluble in typical hydrocarbon solvents. The surface modifier may be represented by the formula, $R_mXH_n$. R may be a branched or straight chain hydrocarbyl group or substituted hydrocarbyl group or groups having one or more carbon atoms. X is at least one heteratom, which may be O, N, P or S or a combination thereof; H is an active hydrogen; and n is such that the compound has no net charge.

Non-limiting examples of the following general structures with R being the hydrocarbyl groups are $RNH_2$, $R_2NH$, $(R'C(OH)_nR'')NH_2$, $(R'C(OH)_nR'')_2NH$, $RCONH_2$, RCNHR, $RN(ROH)_2$, $RCO_2H$, RC(O)NROH, RC(S)OH, and $R_2PO_2H$. These compounds include amines, alcohols, phenols, thiols, silanols, diols, acids, and ethers.

In another embodiment the surface modifier may be expressed by the formula:

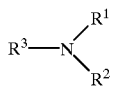

where $R^3$ is hydrogen or a branched or preferably a straight chain alkyl group having 1 to 50 carbon atoms. $R^1$ and $R^2$ may be the same or different and may be the same as $R^3$ or contain another heteroatom such as O, N, P or S.

In another embodiment, the surface modifier is represented by the following formula for an alkoxylated tertiary amine:

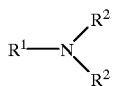

where $R^1$ may be hydrogen or a (linear or branched) alkyl group of from 1 to 50 carbon atoms; $R^2$ may be a hydroxy group such a $(CH_2)_xOH$ radical where x is an integer from 1 to 50, preferably 2 to 25. Non-limiting examples include Kemamine AS-990 (available from Witco Chemical Corporation, Houston, Tex.) having the formula $C_{18}H_{37}N(CH_2CH_2OH)_2$ and Kemamine AS-650 (also available from Witco) having the formula $C_{12}H_{25}N(CH_2CH_2OH)_2$. Other surface modifiers may include bishydroxyethylcocoamine, 2,2-(octadecylamino)bis ethanol, polyoxyethylene alkylamine, butyl stearate, glycerol and SPAN-80 (available from ICI Specialities, Wilmington, Del.) having the formula:

$(CH_3)(CH_2)_7CHCH(CH_2)_7OCOCH_2(CHOH)_4CH_2OH$ (sorbitan mono-oleate).

Quaternary ammonium compounds, hydrocarbyl sulfates or phosphates can also be used as surface modifiers. Tertiary amines, ethoxylated amines and polyether compounds are preferable surface modifiers.

Methods of Producing the Catalyst Systems

The catalyst system of the invention can be made in a variety of different ways. Preferably the metallocene catalyst component and activator are combined to form a solution, which is then added to the carrier, followed by the addition of the surface modifier. In another embodiment, the metallocene component and activator solution are added to the carrier or vice-versa, the latter being preferred, then the resulting mixture, typically a slurry, is dried, optionally wahed and re-dried, and then the surface modifier is added.

In another embodiment the surface modifier is added to a metallocene and/or activator solution directly as a solid or liquid, and then the solution combined with the carrier.

In another embodiment the surface modifier is dry blended with a supported metallocene catalyst system formed by combining the carrier with the metallocene/alumoxane reaction product.

Optionally, the supported catalyst system is prepolymerized either before or after, preferably before, application of the surface modifier to the supported catalyst system.

In the preferred embodiment the metallocene catalyst component is typically slurried in a liquid to form a metallocene solution and a separate solution is formed containing an activator and a liquid. The liquid can be any compatible solvent or other liquid capable of forming a solution or the like with at least one metallocene catalyst component and/or at least one activator. In the preferred embodiment the liquid is a cyclic aliphatic or aromatic hydrocarbon, most preferably toluene. The metallocene and activator solutions are then mixed together and added to a porous support such that the total volume of the metallocene solution and the activator solution or the metallocene and activator solution is less than four times the pore volume of the porous support, more preferably less than three times, even more preferably less than two times, and most preferably in the range of about 0.8 to about 3 times, preferably about 0.9 to about 1.5 times and most preferably in the range of about 0.9 to about 1.25 times. The surface modifier may be added at any stage during this preferred method of making the catalyst system. In the most preferred embodiment, however, the surface modifier is added after.

The weight percent of the surface modifier based on the total weight of the catalyst system is in the range of from about 0.2 to about 5 weight percent, more preferably from about 0.25 to bout 3.5 weight percent and most preferably from about 0.3 to about 3.5 weight percent.

The procedure for measuring the total pore volume of a porous support is well known in the art. Details of one of these procedures is discussed in Volume 1,*Experimental Methods in Catalytic Research* (Academic Press, 1968) (specifically see pages 67–96). This preferred procedure involves the use of a classical BET apparatus for nitrogen absorption. Another method well known in the art is described in Innes, *Total porosity and Particle Density of Fluid Catalyst By Liquid Titration,* Vol. 28, No. 3, Analytical Chemistry 332–334 (March, 1956).

The general support technique employed involves contacting, in a suitable solvent or other liquid, a metallocene catalyst component as described above with alumoxane or methylalumoxane (MAO) to form a soluble reaction product. The soluble reaction product is then contacted with a porous carrier, wherein the total volume of the soluble reaction product added to the carrier is less than four times the pore volume of the carrier. The resulting supported catalyst system can be dried to ensure that essentially all or most of the residual solvent is removed from the pores of the carrier before or after the introduction of a surface modifier. A free flowing supported catalyst system is thereby obtained.

In one embodiment, a method to produce a free flowing, optionally prepolymerized supported catalyst system is provided, the method comprising the steps of: a) forming in a suitable solvent, a metallocene/alumoxane mixture wherein the metallocene is as described above; b) contacting the mixture of (a) with a porous carrier, wherein the total volume of the mixture added to the porous carrier is less than four times the pore volume of the carrier; c) removing essentially all the solvent; d) introducing a surface modifier; e) obtaining a supported catalyst system; and f) optionally prepolymerizing said supported catalyst system with one or more olefinic monomer(s), to form a prepolymerized supported catalyst system. This supported catalyst system is useful for the production of polymers of propylene or copolymers thereof, having a molecular weight of about 50,000 or greater, preferably 100,000 or greater, a melting point of about 125° C. or greater, preferably about 135° C. or greater, and more preferably about 145° C. or greater and a bulk density of about 0.30 g/cm$^3$ or greater. The resulting granular polymer also has a preferred average particle size of about 300 to about 1000 microns or greater.

The catalyst system of the invention can be dried and still contain an amount of solvent, for example, toluene, in its dried state, however, it is preferred that substantially all the solvent is removed. For the purposes of this patent specification and appended claims the term "substantially all of the solvent is removed" means that greater than about 90% of all the solvent is removed from the supported catalyst system when drying.

In another embodiment of the invention, the mole ratio of the metal of the alumoxane component to the transition metal of the metallocene component is in the range of ratios between 10:1 to 800:1, preferably 20:1 to less than 500:1, and most preferably 50:1 to less than 400:1.

Polymerization Process of the Invention

The catalyst system of this invention is suited for the polymerization of monomers and optionally comonomers in any polymerization or prepolymerization process, gas, slurry or solution phase; even a high pressure autoclave process can be utilized. In the preferred embodiment a gas phase or slurry phase process is utilized, most preferably a bulk liquid propylene polymerization process.

In the preferred embodiment, this invention is directed toward bulk liquid propylene slurry or gas phase polymerization or copolymerization reaction s involving the polymerization of propylene with one or more of the alpha-olefin monomers having from 4 to 20 carbon atoms, preferably 4–12 carbon atoms, for example alpha-olefin comonomers of ethylene, butene-1, pentene-1, 4-methylpentene-1, hexene-1, octene-1, decene-1, and cyclic olefins such as styrene. Other monomers can include polar vinyl, diolefins such as dienes, norbornene, acetylene and aldehyde monomers.

In one preferred embodiment, the process of the invention is carried out in the absence of or in an rector environment that is essentially free of a scavenger material such as alkylaluminum compounds, for example, triethylaluminum, trimethylaluminum and isolbutylaluminum. For the purposes of this patent specification and appended claims the term "essentially free" means that less than 100 ppm by weight of scavenger is present in the reactor at any given point in time during polymerization.

EXAMPLES

In order to provide a better understanding of the present invention including representative advantages and limitation thereof, the following examples are offered.

Example 1

Preparation of Catalyst A

To a two gallon (7.6 liter) reactor previously flushed with N$_2$ was added 3900 mL of methylalumoxane (MAO) in toluene (available from Witco Chemical Company, Houston, Tex., 10 Wt % MAO solution) followed by 9.0 g of dimethylsilylbis(2-methyl-4,5-benzo-indenyl)zirconium dichloride dissolved in an additional 350 mL of MAO. The combined solutions were stirred for 10 minutes. As stirring continued, 400 g of silica (Davison Grade MS948FF, previously dehydrated to 800° C. under flowing N$_2$, available from W. R. Grace, Davison Chemical Division, Baltimore, Md.) was added over 10 minutes. The toluene was removed under a slow N$_2$ purge while raising temperature and vacuum to 68° C. and 25 in. (64 cm) of Hg to give a free flowing solid. The catalyst solid was washed four times with 5–7 liters of hexane each and the final wash decanted. After a second drying as above 560 g of a free flowing solid was obtained. 250 g of the catalyst was charged to the reactor previously loaded with 4 liters of hexane and 5 mL of a 25 wt % solution of triisobutylaluminum in hexane (available from Witco). Under stirring the slurry was cooled to 1–2° C. and a cylinder containing ethylene and hydrogen (3 mol % H$_2$, Matheson Gas Products) was connected to the reactor. The gas was added to the vapor phase at a flow rate of 0.08–0.17 cubic feet per minute (38–80 cubic cm per second) to control the slurry temperature to less than about 5° C. After 90 minutes N$_2$ was used to purge the excess ethylene and hydrogen. The prepolymerized catalyst slurry was washed four times with 5–7 liters of hexane each and the final wash decanted. After drying under vacuum solid catalyst A was recovered.

Polymerization

All the catalysts prepared were polymerized in accordance with the following procedure. A 2 liter autoclave reactor previously flushed with N$_2$ and containing triethylaluminum (0.5 mL of a 1M solution in hexane) and 1000 mL of propylene was heated to a temperature of 74° C. The catalyst sample was slurried in 2 mL of hexane. The catalyst was charged to the reactor with a flush of 250 mL propylene to start the reaction. After one hour the reactor was cooled, vented and purged with N$_2$ for 20 minutes and then opened. The condition of the polymer and fouling level of the reactor was noted. After removal from the reactor, the polymer was dried for a minimum of 2 hours at 75° C. in vacuo. After recovery the dried polymer was weighted and the activity is calculated.

Example 2

A 205 mg sample of catalyst A prepared above in Example 1 was dry blended with 4 mg of Kemamine AS990 (available from Witco) and placed in a catalyst charge tube along with 2 mL of hexane then added to the reactor as described above. Polymerization was carried out as described in Example 1. After one hour the polymerization was stopped. Inspection of the reactor showed no fouling and free flowing, granular polymer. 234 g of dried polymer was recovered equivalent to 1.14 Kg of polypropylene per g of catalyst charged.

Comparative Example 3

A 200 mg sample of the catalyst A used in Example 1 was used but without Kemamine AS990. Polymerization was carried out as described in Example 1. After one hour the polymerization was topped. Inspection of the reactor showed fouling on the stirring shaft and reactor walls. 232 g of dried polymer was recovered equivalent to 1.16 Kg of polypropylene per g of catalyst charged. Results are shown in Table 1.

Example 4 and Comparative Example 5

Preparation of Catalyst B

A second prepolymerized catalyst (B) was prepared in an identical manner to catalyst A. A 203 mg sample of prepolymerized catalyst B was tested for propylene polymerization with and without Kemamine AS990. Polymerization was carried out as described in Example 1. Results are shown in Table 1.

Comparative Example 6

This particular example illustrates adding the Kemamine AS990 to the catalyst was unexpectedly better than adding it to the reactor. A 4 mg sample of the Kemamine AS990 was added to the reactor along with triethylaluminum and propylene. A 200 mg sample of Catalyst A was charged to the reactor with 250 ml of propylene to start the reaction. Polymerization was carried out as described in Example 1. Results are shown in Table 1.

TABLE 1

| Examples | Catalyst | Wt % | Surface Modifier Added to ... | Activity (Kg/g cat) | Fouled |
|---|---|---|---|---|---|
| 2 | A | 2 | Catalyst | 1.14 | No |
| Comp. 3 | A | 0 | — | 1.16 | Yes |
| 4 | B | 2 | Catalyst | 1.49 | No |
| Comp. 5 | B | 0 | — | 1.53 | Yes |
| Comp. 6 | A | 2 | Reactor | 0.375 | Yes |

In summary, the data shows that when dry blended with the catalyst of the invention, 2 wt % of a surface modifier, Kemamine AS990, eliminated reactor fouling with little impact on catalyst activity. Where the surface modifier is added to the reactor separately from the catalyst, fouling is not eliminated and catalyst activity is diminished by more than 65%.

While the present invention has been described and illustrated by reference to particular embodiments, it will be appreciated by those of ordinary skill in the art that the invention lends itself to variations not necessarily illustrated herein. For this reason, then, reference should be made solely to the appended claims for purposes of determining the true scope of the present invention.

What is claimed is:

1. A process for polymerizing propylene alone or in combination with one or more other olefins, said process comprising polymerizing in the presence of a supported catalyst system prepared by combining an alumoxane, a surface modifier, a porous carrier, and a metallocene catalyst component in a solvent to form a solution wherein the surface modifier is represented by the formula:

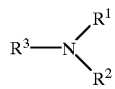

wherein $R^3$ is hydrogen or a branched or linear alkyl group having 1 to 50 carbon atoms; and $R^1$ is hydrogen or a branched or linear alkyl group having 1 to 50 carbon atoms which may contain a heteroatom selected from O, N, P or S; and $R^2$ is $(CH_2)_x OH$ wherein x is an integer from 1 to 50 and wherein the metallocene catalyst component is represented by the following formula:

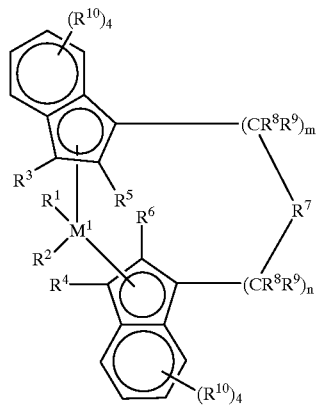

wherein $M^1$ is a metal of group 4, 5, or 6 of the Periodic Table, $R^1$ and $R^2$ are identical or different, are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^3$ and $R^4$ are hydrogen atoms;

$R^5$ and $R^6$ are identical or different, preferably identical, are one of a halogen atom, a $C_1$–$C_{10}$ alkyl group, which may be halogenated, a $C_6$–$C_{10}$ aryl group, which may be halogenated, a $C_2$–$C_{10}$ alkenyl group, a $C_7$–$C_{40}$ arylalkyl group, a $C_7$–$C_{40}$ alkylaryl group, a $C_8$–$C_{40}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, a $C_1$–$C_{10}$ alkyl group, or a $C_6$–$c_{10}$ aryl group;

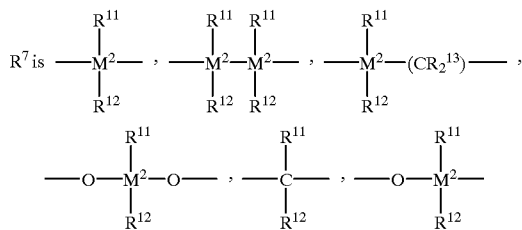

=$BR^{11}$, =$AlR^{11}$, —Ge—, —Sn—, —O—, —S—, =SO, =$SO_2$, =$NR^{11}$, =CO, $PR^{11}$, or =$P(O)R^{11}$; wherein:

$R^{11}$, $R^{12}$ and $R^{13}$ are identical or different and are a hydrogen atom, a halogen atom, a $C_1$–$C_{20}$ alkyl group, a $C_2$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$c_{40}$ arylalkenyl group, $C_7$–$C_{40}$ alkylaryl group, or $R^{11}$ and $R^{12}$, or $R^{11}$ and $R^{13}$, together with the atoms binding them, can form ring systems;

$M^2$ is silicon, germanium or tin;

$R^8$ and $R^9$ are identical or different and have the meanings as stated for $R^{11}$;

m and n are identical or different and are zero, 1 or 2, m plus n being zero, 1 or 2; and the radicals $R^{10}$ are identical or different and have the meanings stated for $R^{11}$, $R^{12}$ and $R^{13}$ wherein further two adjacent $R^{10}$ radicals can be joined together to form a ring system.

2. The process of claim 1 wherein the alumoxane and metallocene are contacted first in a solution which is then combined with the porous carrier wherein the total volume of the solution is less than about four times the total pore volume of the porous support.

3. The process of claim 1 wherein the total volume of the solution is less than about two times the total pore-volume of the porous support.

4. The process of claim 1 wherein the total volume of the solution is from about 0.8 to about 3 times the total pore volume of the porous support.

5. The process of claim 1 wherein the metallocene catalyst component comprises two or more metallocene catalyst components.

6. The process of claim 1 wherein the mole ratio of the aluminum of the alumoxane to the transition metal of the metallocene catalyst component is in the range of between 20:1 to less than 500:1.

7. The process of claim 1 further comprising the step of prepolymerizing the supported catalyst system with an olefinic monomer.

8. The process of claim 1 wherein the metallocene component is selected from the group consisting of:

rac-dimethylsilylbis (2-methyl-4,5-benzoindenyl)-zirconium dichloride, rac-dimethylsilylbis(2-methylindenyl)-zirconium dichloride, rac-dimethylsilyl-bis(2-methyl-4,6-diisopropylindenyl)-zirconium dichloride, rac-dimethylsilylbis(2-methyl-4-phenylindenyl)zirconium dichloride, and rac-dimethylsilylbis(2-ethyl-4-phenylindenyl)zirconium dichloride.

9. The process of claim 1 wherein the surface modifier is present in an amount in the range of 0.2 weight percent to less than 5 weight percent of the total weight of the supported catalyst system.

10. The process of claim 1 wherein the surface modifier is represented by the formula:

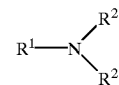

where $R^1$ is hydrogen or a linear or branched alkyl group of from 1 to 50 carbon atoms; $R^2$ is $(CH_2)_x OH$ wherein x is an integer from 1 to 50.

11. The process of claim 1 wherein the surface modifier is selected from at least one of the group of compounds represented by the following chemical formula:

$$C_{18}H_{37}N(CH_2CH_2OH)_2 \text{ and } C_{12}H_{25}N(CH_2CH_2OH)_2.$$

12. The process of claim 1 wherein the polymerization is conducted in the gas phase.

13. The process of claim 1 wherein the polymerization is conducted in solution.

14. The process of claim 1 wherein propylene is copolymerized with ethylene, 1-butene or 1-hexane.

* * * * *